US005652325A

United States Patent [19]
Miyazaki et al.

[11] Patent Number: 5,652,325
[45] Date of Patent: Jul. 29, 1997

[54] PRODUCTION OF ALIPHATIC COPOLYESTERS

[75] Inventors: Keiko Miyazaki; Hiroshi Noguchi, both of Yokohama; Takayuku Ota, Tokyo-to; Atsushi Kasai; Hiroaki Yamaoka, both of Yokohama, all of Japan

[73] Assignee: Mitsubishi Chemical Corporation, Tokyo, Japan

[21] Appl. No.: 605,799

[22] Filed: Feb. 22, 1996

[51] Int. Cl.⁶ .................................... C08G 63/78
[52] U.S. Cl. ................. 528/283; 528/271; 528/272
[58] Field of Search ...................... 528/271, 272, 528/283

[56] References Cited

U.S. PATENT DOCUMENTS

| | | | |
|---|---|---|---|
| 5,401,796 | 3/1995 | Kashima et al. | 524/706 |
| 5,403,897 | 4/1995 | Ebato et al. | 525/444 |
| 5,484,882 | 1/1996 | Takada et al. | 528/361 |

FOREIGN PATENT DOCUMENTS 0 618 249  10/1994  European Pat. Off. .
0 647 668  4/1995  European Pat. Off. .

OTHER PUBLICATIONS

Database WPI, Derwent Publications, AN–96–094286, JP-A-08-003-296, Jan. 9, 1996.
Chemical Abstracts, vol. 123, No. 18, Oct. 30, 1995, AN–231452, JP-A-07-053-899, Feb. 28, 1995.
Database WPI, Derwent Publications, AN–95–070374, JP-A-06-345-856, Dec. 20, 1994.
Chemical Abstracts, vol. 80, No. 4, Jan. 28, 1974, AN–15485, JP-B-47-042-756, Oct. 28, 1972.

*Primary Examiner*—Terressa Mosley
*Attorney, Agent, or Firm*—Oblon, Spivak, McClelland, Maier & Neustadt, P.C.

[57] ABSTRACT

Aliphatic polyester copolymers, which have molecular weights high enough for practical use and which are excellent in thermal stability, tensile strength and moldability, and which are biodegradable as well, are provided, which are produced by a process comprising effecting polycondensation of an aliphatic diol and an aliphatic dicarboxylic acid in the presence of an aliphatic monohydroxymonocarboxylic acid in a specific amount and of a catalyst comprising a germanium compound.

14 Claims, No Drawings

PRODUCTION OF ALIPHATIC COPOLYESTERS

BACKGROUND OF THE INVENTION

1. Field of the Invention

The present invention relates to the production of high-molecular-weight aliphatic copolyesters which can be molded into desired molded materials thanks to their high molecular weight by any of molding methods used for general-purpose plastics, such as injection molding, blow molding and extrusion molding. More particularly, the present invention relates to the production of aliphatic copolyesters which are biodegradable, which have molecular weights high enough for practical use and which are excellent in thermal stability, tensile strength and the like.

2. Related Art

Heretofore, polyesters to be molded into molded materials such as films and fibers have been high-molecular-weight polyesters having number-average molecular weights of 10,000 or more. These high-molecular-weight polyesters have been limited to those polyesters which are prepared from terephthalic acid and ethylene glycol or 1,4-butanediol (since the polyesters of this type contain an aromatic component, that is, the dicarboxylic acid component thereof is aromatic, they are hereinafter referred to as aromatic polyesters), and those polyesters which contain no aromatic component, that is, aliphatic polyesters, have been scarcely used for molding. The reasons why aliphatic polyesters have not been put to practical use so much include the following: (1) the melting points of aliphatic polyesters would be relatively low; and (2) aliphatic polyesters having number-average molecular weights of 15,000 or more would not be obtained by any known polycondensation reaction because thermal decomposition tends to occur in the course of the reaction, and aliphatic polyesters whose number-average molecular weights are approximately 10,000 would not have strength high enough for practical use.

As being proposed in Japanese Laid-Open Patent Publications Nos. 189822/1992 and 287043/1993, a high-molecular-weight aliphatic polyester having urethane bond can be obtained by a method where use is made as a coupling agent of an isocyanate added to a polyester diol whose end group is substantially hydroxyl group, whose number-average molecular weight is 5,000 or more, preferably 10,000 or more and which is in the melted state by being heated to the melting point thereof or higher. However, as far as the inventors of the present invention know, when high-molecular-weight aliphatic polyesters having urethane bond are molded by any molding method used for general-purpose plastics, such troubles tend to be caused depending upon the molding conditions adopted that the polyesters are undesirably colored and that microgels are unfavorably produced.

Further, as being proposed in Japanese Laid-Open Patent Publication No. 310898/1993, a high-molecular-weight aliphatic polyester whose end group is substantially hydroxyl group and whose number-average molecular weight is from 25,000 to 70,000 can be synthesized by esterifying a glycol component and an aliphatic dicarboxylic component to obtain a polyester diol, and subjecting the polyester diol to a glycol-eliminating reaction which is carried out in the presence of a catalyst at a temperature ranging from 180° to 230° C. under a highly reduced pressure of 0.005 to 0.1 mmHg. However, as far as we know, to industrially attain such a state of high vacuum is accompanied with difficulty.

Furthermore, Japanese Laid-Open Patent Publication No. 43665/1993 discloses a process for producing an aliphatic polyester having a reduced viscosity of 0.67 to 0.89, in which an aliphatic oxycarboxylic acid such as lactic acid or glycolic acid is thermally dehydrated and polycondensed in the presence of a germanium compound in a stream of an inert gas or under reduced pressure. However, as far as we know, those films and other molded materials which are obtained from this aliphatic polyester cannot have mechanical strength high enough for practical use.

Still further, Japanese Laid-Open Patent Publication No. 228675/1995 and No. 189822/1995 propose a process for producing an aliphatic polyester having a relatively high molecular weight. However, as far as we know, the process requires a use of an organic solvent which would entail the necessity of removal and recovery of the solvent used, and the solvent so recovered would require purification for its re-use, whereby the process would not be regarded as advantageous in its commercial practice.

SUMMARY OF THE INVENTION

An object of the present invention is to provide aliphatic copolyesters which have molecular weights high enough for practical use, which are excellent in thermal stability, tensile strength and the like and which additionally have biodegradability.

It have been found that when an aliphatic diol and an aliphatic dicarboxylic acid or a derivative thereof, main components, are copolymerized with a specific amount of an aliphatic monohydroxymonocarboxylic acid such as lactic acid or glycolic acid in the presence of a catalyst comprising a germanium compound, the polymerization rate is drastically increased, so that a high-molecular-weight aliphatic polyester copolymer having a number-average molecular weight of 10,000 or more can be extremely easily obtained without using any chain extender. The present invention has been accomplished on the basis of this finding.

The present invention is therefore to provide a process for producing an aliphatic copolyester. The process for producing an aliphatic copolyester, comprising reacting an aliphatic dicarboxylic acid with an aliphatic diol under the polyester-producing condensation conditions, is characterized in that the reaction is carried out in the presence of a catalyst comprising a germanium compound and of an aliphatic monohydroxymonocarboxylic acid in an amount of 0.04 to 60 mol for 100 mol of the aliphatic dicarboxylic acid so as to obtain an aliphatic copolyester whose number-average molecular weight is at least 10,000.

The present invention is thus directed to an improvement in the process for producing an aliphatic polyester, in which an aliphatic dicarboxylic acid and an aliphatic diol are reacted with each other under the polyester-producing condensation conditions. The improvement includes the use of a germanium catalyst and a specific amount of an aliphatic monohydroxymono-carboxylic acid in the condensation reaction. By this improvement, the present invention has succeeded in obtaining aliphatic polyesters having high molecular weights, in particular, having number-average molecular weights of 10,000 or more; it would have been impossible to attain such high molecular weights by conventional simple polycondensation reactions.

Since an aliphatic monohydroxymonocarboxylic acid is present in the polycondensation reaction, it is understood that the aliphatic polyester produced is a copolyester. It is considered to be an interesting finding that an aliphatic polyester having an increased molecular weight can be obtained by having the aliphatic polyester take such a copolymeric structure, and, at the same time, by carrying out the reaction in the presence of a specific catalyst, that is, a germanium compound.

Besides having a high molecular weight, the aliphatic copolyester of the present invention has a relatively high melting point and strength high enough for practical use. Further, since the copolyester contains an hydoxycarboxylic acid component introduced, it has lowered crystallinity, and is thus flexible. Furthermore, the high-molecular-weight aliphatic polyester of the present invention has excellent biodegradability.

DESCRIPTION OF THE PREFERRED EMBODIMENTS OF THE PRESENT INVENTION

1. Basis of Reaction to Produce Aliphatic Polyester in the Present Invention

As mentioned previously, the process for producing an aliphatic copolyester according to the present invention basically comprises the step of reacting an aliphatic dicarboxylic acid with an aliphatic diol under the polyester-producing condensation conditions.

The "polyester-producing condensation conditions" herein include not only the conditions under which a dehydration reaction between the essential bifunctional reactants, that is, a dicarboxylic acid and a diol, is carried out, but also the conditions under which a condensation reaction is carried out when use is made of a functional derivative/ derivatives of either one of or both of these reactants. For instance, a functional derivative of an aliphatic dicarboxylic acid is, for example, a di-lower alkyl ester thereof. In this case, the condensation reaction to take place is an ester-exchange reaction accompanied by the elimination of a lower alkanol. When the aliphatic dicarboxylic acid is an anhydride or an acid halide, on the other hand, the condensation reaction proceeds naturally via addition followed by dehydration and/or ester exchange or via dehydrohalogenation. Also included herein in the "polyester-producing condensation conditions" is a use of a preliminarily provided oligomer, which herein includes such low molecular weight products as a bis-ester, which oligomer is then subjected to further condensation with elimination of the diol used into a polymer, as may be practiced in production of polyethylene terephthalate wherein bis(β-hydroxyethyl) terephthalate is provided which then undergoes deglycolation or what is commonly called "polycondensation" into a higher molecular weight condensation product.

Further, the reduction of pressure and/or the application of heat, and/or the use of an azeotropic agent in the case of dehydration, or of alkali in the case of dehydrohalogenation to be adopted in order to easily eliminate those low-molecular-weight by-products which are formed in the course of the condensation reaction, that is, water, a lower alkanol, a diol or a hydrogen halide, to the outside the reaction system are also specific examples of the "polyester-producing condensation conditions".

Among these "polyester-producing condensation conditions", the use of, as the aliphatic dicarboxylic acid, a dicarboxylic acid or a di-lower alkyl ester thereof, in particular, the former one, and the reduction of pressure and/or the application of heat are preferred.

The degree of the reduction of pressure and/or that of the application of heat is usually increased as the condensation reaction proceeds, that is, with an increase in the polycondensation degree of the polymer produced.

One of the characteristics of the present invention is that the reaction between the above-described essential bifunctional monomer components to be effected under the polyester-producing condensation conditions is carried out in the presence of a specific amount of an aliphatic monohydroxymonocarboxylic acid (hereinafter referred to as an aliphatic oxycarboxylic acid) which is also bifunctional. It is needless to say that this aliphatic oxycarboxylic acid is equivalent to the above-described essential monomer components in respect of the hydroxyl- and carboxyl-group moieties thereof. It is therefore considered that the aliphatic oxycarboxylic acid reacts with the above essential monomer components to yield a copolyester. For this reason, the requirement "the reaction is carried out under the polyester-producing condensation conditions" given in the present invention is also applied to this aliphatic oxycarboxylic acid. Therefore, the "aliphatic oxycarboxylic acid" used in the present invention also includes functional derivatives thereof, for example, lower alkyl esters thereof (the details will be given later).

As is clear from the above description, the terms "aliphatic dicarboxylic acid" and "aliphatic oxycarboxylic acid" (which means, of course, an aliphatic monohydroxymonocarboxylic acid) used for the explanation of the present invention are to respectively include the functional derivatives thereof which are in the above-described sense.

2. Basis of Reaction to Produce Aliphatic Polyester in the Present Invention (bis)

One of the reactants to be subjected to the reaction which is carried out under the above-described basic polyester-producing condensation conditions is an aliphatic dicarboxylic acid. It is clear from the above description that this aliphatic dicarboxylic acid includes functional derivatives thereof, for example, di-lower alkyl esters thereof.

The aliphatic dicarboxylic acids can thus be represented by the following formula:

$$R^o\text{---CO---}R^1\text{---CO---}R^o \qquad (1)$$

wherein $R^1$ represents a direct bond or a divalent aliphatic group, and $R^o$ represents OH or a functional derivative of the carboxyl group, for instance, —$OR^a$ ($R^a$: a lower alkyl such as a $C_1$–$C_4$ alkyl) or —X (X: a halogen such as chlorine), or anhydride group (—CO—O—CO—) formed by the two (CO—$R^o$)s. A preferable —$OR^a$ is OH, or anhydride group (—CO—O—CO—) formed by the two —$OR^a$s; the former one, OH, is particularly preferred.

In the present invention, the "aliphatic group" includes an "alicyclic group". In addition, the aliphatic group may also be one which contains therein ether oxygen as long as it does not impair the advantages of the present invention.

Preferable specific examples of $R^1$ are —$(CH_2)_m$— wherein m is 0 or an integer of 1 to 10, preferably 0 or an integer of 1 to 6. Particularly preferable specific examples of the aliphatic dicarboxylic acid are, therefore, those which are represented by the following formula:

$$HOCO\text{---}(CH_2)_m\text{---}COOH \qquad (1a).$$

Specific examples of such aliphatic dicarboxylic acids include oxalic acid, succinic acid, glutaric acid, adipic acid, sebacic acid, dodecanoic diacid, cyclohexanedicarboxylic acid (in particular, 4,4'-), lower alcohol esters thereof, succinic anhydride, and adipic anhydride. Of these, succinic acid, adipic acid, sebacic acid, anhydrides thereof, and lower alcohol esters thereof are preferred from the viewpoint of the physical properties of the resulting copolymers, and succinic acid, succinic anhydride, and a mixture thereof are particularly preferred. Also preferred is a mixture of (i) succinic acid and/or its anhydride and (ii) adipic acid. These aliphatic dicarboxylic acids can be used either singly or in combination of two or more.

As the aliphatic diol, another reactant to be used in the production of an aliphatic polyester, an aliphatic diol represented by the following formula is suitable:

$$HO—R^2—OH \qquad (2)$$

wherein $R^2$ represents a divalent aliphatic group. It is clear from the above description that the "aliphatic group" indicated by $R^2$ includes an "alicyclic group" and that it may, upon necessity, contain ether oxygen.

Preferable examples of the divalent aliphatic hydrocarbon group indicated by $R^2$ include those which are represented by $—(CH_2)_n—$ (n is an integer of 2 to 10). Of these aliphatic hydrocarbon groups, preferable ones are those in which n is an integer of 2 to 6.

Therefore, preferable aliphatic diols are represented by the following formula:

$$HO—(CH_2)_n—OH \qquad (2a).$$

Preferable divalent alicyclic hydrocarbon groups are those which are represented by the formula (2) in which $R^2$ comprise a cyclic structure and is of 3 to 10 carbon atoms. Particularly preferable alicyclic hydrocarbon groups are those of the formula (2) in which $R^2$ is of 4 to 6 carbon atoms. The alicyclic hydrocarbon groups can be of such a hybrid structure that it comprises a cyclic moiety connected with a linear moiety.

Specific examples of the aliphatic diol represented by the above formula include ethylene glycol, trimethylene glycol, 1,3-propanediol, 1,4-butanediol, 1,5-pentanediol, 1,6-hexanediol, 1,4-cyclohexanediol and 1,4-cyclohexanedimethanol. Of these, 1,4-butanediol is particularly preferred from the viewpoint of the physical properties of the resulting copolymers. These aliphatic diols can be used either singly or in combination of two or more.

3. Improvements Made by the Present Invention

Improvements in the above-described basic process for producing an aliphatic polyester, made by the present invention are such that a specific amount of an aliphatic oxycarboxylic acid is included in the condensation reaction system and that a catalyst comprising a germanium compound is used for the condensation reaction. By these improvements, it is made possible to obtain a polyester whose molecular weight is 10,000 or more, preferably 20,000 or more, for example 10,000 to 200,000.

(1) Aliphatic Oxycarboxylic Acid

The "aliphatic oxycarboxylic acid" defined in the present invention is one which is added in the reaction system when the reaction is carried out under the polyester-producing condensation conditions, and, accordingly, also includes functional derivatives thereof.

Therefore, the aliphatic oxycarboxylic acid can be represented by the following formula:

$$HO—R^3—CO—R^0 \qquad (3)$$

wherein $R^3$ is a divalent aliphatic group having preferably 1 to 11 carbon atoms, more preferably 1 to 6 carbon atoms. $R^3$ can also be either alicyclic or one which contains therein ether oxygen as the above-described $R^1$ and $R^2$.

$R^0$ can be defined by the same definition as is described previously in terms of the aliphatic dicarboxylic acid (note that both of the $R^0$s are not required to be the same in a given reaction system). However, since this comonomer component is a monohydroxymonocarboxylic acid, it may be necessary to point out that there is a difference between $R^0$ in this component and that in the aliphatic dicarboxylic acid. Namely, in the case of the oxycarboxylic acid, $R^0$ can represent not only a lower alkyl ester as in the case of the dicarboxylic acid, but also can form an intramolecular ester. The anhydride of the ester in the latter case is an intermolecular anhydride. Preferable $—OR^0$ in the formula (3) is $—OH$.

In the present invention, a particularly preferable aliphatic oxycarboxylic acid is one represented by the following formula, which would remarkably polymerization reactivity in accordance with the present invention:

$$HO—\underset{\underset{C_aH_{2a+1}}{|}}{CH}—COOH \qquad (3a)$$

wherein a is 0 or an integer of 1 to 10, preferably 0 or an integer of 1 to 5.

Specific examples of the aliphatic oxycarboxylic acid include lactic acid, glycolic acid, 2-hydroxy-n-butyric acid, 2-hydroxycaproic acid, 2-hydroxy-3,3-dimethylbutyric acid, 2-hydroxy-3-methylbutyric acid, 2-hydroxyisocaproic acid, and a mixture thereof. In the case where these aliphatic oxycarboxylic acids have optical isomers, it is possible to use any one of the D-isomer, L-isomer and racemic mixture thereof. In addition, they may be either in the state of solid or liquid, or in the form of an aqueous solution. Of these, lactic acid and glycolic acid are preferred, and particularly preferable ones are lactic acid which can remarkably accelerate the polymerization rate and which is readily obtainable. A 30–95% aqueous solution of the acid is preferred because such a solution is readily obtainable. These aliphatic oxycarboxylic acids can be used either singly or in combination of two or more.

(2) Polycondensation Reaction/Use of Catalyst

Polycondensation between a diol and a dicarboxylic acid, including a reaction between functional derivatives of these reactants, in particular, a reaction in which a functional derivative of a dicarboxylic acid is used, has been known. Moreover, it is also known that oxycarboxylic acids having the functionalities of these essential two reactants takes part in the polycondensation.

The condensation reaction in the present invention can similarly be carried out with due consideration that use is made of a catalyst comprising a germanium compound under the reaction conditions which are properly selected in accordance with the conventional condensation reactions, depending upon the reactants to be used and/or the desired polymerization degree.

In a preferred embodiment of the present invention, the carboxyl functionality of the reactant is carboxyl group, so that the condensation reaction proceeds via dehydration as mentioned previously. It is therefore preferable to carry out such a polycondensation reaction in the presence of substantially no water. Therefore, a preferred embodiment of the present invention is to carry out the condensation reaction in the presence of substantially no water. Water, however, is, in general, a suitable solvent for the three reactants used in this reaction, and in the case where the catalyst used is soluble in an aqueous medium, it is acceptable to use only a small amount of water so as to supply some of the reactants and/or the catalyst or to have these present in the reaction system as a solution thereof. This is why the requirement "in the presence of substantially no water" is given. Besides the use of no water, it is also preferable to use substantially no organic solvent, unless it is used for the purpose of azeotropic removal of water and the by-products of the condensation reaction. For this reason, a preferred embodiment of the present invention is to carry out the condensation reaction in the presence of substantially no solvent.

Stoichiometrically, the amount of the aliphatic diol used is substantially equimolar to that of the aliphatic dicarboxylic acid used. In general, however, the aliphatic diol is used in an excess of 1 to 50 mol %, preferably 5 to 30 mol %, over the amount of the aliphatic dicarboxylic acid, namely 101 to 150 mol, preferably 105 to 130 mol, per 100 mol of the aliphatic dicarboxylic acid, because it may escape in the course of the polycondensation reaction.

When the amount of the aliphatic oxycarboxylic acid added is too small, the advantages of the addition thereof would not be obtained. On the other hand, when the amount of the aliphatic oxycarboxylic acid is too large, the resulting copolyester may be insufficient in heat resistance and mechanical properties. For this reason, the amount of the aliphatic oxycarboxylic acid to be added is preferably from 0.04 to 60 mol, more preferably from 1.0 to 40 mol, particularly from 2 to 20 mol, for 100 mol of the aliphatic dicarboxylic acid used.

There is no particular limitation on the timing and manner of the addition of the aliphatic oxycarboxylic acid as long as it is present in the polycondensation reaction, and the following manners can be mentioned as examples: (1) a manner in which a solution, for example an aqueous solution, of the aliphatic oxycarboxylic acid in which a catalyst has been dissolved in advance is added to the reaction system; and (2) a manner in which the aliphatic oxycarboxylic acid is added simultaneously with the addition of a catalyst when the starting materials are charged.

The aliphatic copolyester of the present invention can be produced by carrying out the condensation reaction in the presence of a polymerization catalyst. A germanium compound is suitable as the catalyst. There is no particular limitation on the germanium compound as long as it has catalystic activity on the polycondensation, and any of inorganic germanium compounds such as germanium oxide and germanium halides (for example, germanium chloride), and organic germanium compounds such as tetraalkoxygermaniums (alkoxy: $C_1$–$C_6$, preferably about $C_1$–$C_6$) can be used. Of these, germanium oxide, tetraethoxygermanium and tetrabutoxygermanium are preferred because they are easily available at reasonable prices; and germanium oxide is particularly preferred.

In the present invention, the catalyst comprising such a germanium compound may be either soluble or insoluble in the polycondensation reaction system. However, it is preferable that the catalyst be at least partially soluble in the reaction system.

Other catalysts known in the art for polycondensation can also be used together with the germanium catalyst as long as they do not interfere with the attainment of the objects of the present invention. Examples of the catalysts which can be used together with the germanium catalyst include organic or inorganic compounds of Ti, Zn, Mg, Ca or Sn.

The amount of the catalyst to be used is from 0.001 to 3% by weight, preferably from 0.005 to 1.5% by weight, of the total amount of the reactants used. It is enough that the catalyst be present in the reaction system while the polycondensation reaction is carried out. There is no particular limitation on the timing of the addition of the catalyst as long as it is before the initiation of the polycondensation reaction. The catalyst can be added either at the time when the starting materials are charged, or at the time when the reduction of the pressure of the reaction system is started. It is preferable to adopt one of the following manners: a manner in which the catalyst is added simultaneously with the addition of the aliphatic oxycarboxylic acid such as lactic acid or glycolic acid when the starting materials are charged; and a manner in which a solution prepared by dissolving the catalyst in water or in an aqueous solution of the aliphatic oxycarboxylic acid is added to the reaction system. Of these, the manner in which a solution prepared by dissolving the catalyst in an aqueous solution of the aliphatic oxycarboxylic acid is added to the reaction system is particularly preferred because the catalyst is highly preservable in such a solution.

The conditions such as temperature, pressure and time under which the aliphatic polyester copolymer is produced are as follows: the reaction temperature can be selected from the range of 150° to 260° C., preferably from the range of 180° to 230° C.; the reaction pressure at the polycondensation reaction can be selected from the range of 10 mmHg or less, preferably from the range of 2 mmHg or less. The temperature and/or the degree of reduction of the pressure can be increased at the latter stage of the reaction in accordance with the common manner in conventional polycondensation reactions which proceed successively.

The polymerization time can be selected from the range of 2 hours or more, preferably from the range of 4 to 15 hours. The polymerization time generally depends upon the desired polymerization degree of a polyester to be produced. Inherently in the present invention, the aliphatic oxycarboxylic acid employed gives rise to the effects of increasing the polymerization degree. It may therefore be said that the polymerization time in the present invention is a time needed until the number-average molecular weight of a polyester reaches at least 10,000 for given temperature and/or pressure condition, and/or for given catalytic conditions.

The aliphatic copolyester obtainable by the process of the present invention generally has the following compositional aspects. The diol unit and the aliphatic dicarboxylic acid unit are substantially equimolar. Further, it is preferable that the amount of the aliphatic diol unit and that of the aliphatic dicarboxylic acid unit be respectively selected from the range of 35 to 49.99 mol %, preferably from the range of 40 to 49.75 mol %, more preferably from the range of 45 to 49.5 mol %. It is preferable to select the amount of the aliphatic oxycarboxylic acid unit from the range of 0.02 to 30 mol %. When the amount of the aliphatic oxycarboxylic acid is in excess of 30 mol %, the resulting polyester is not satisfactory in heat resistance and mechanical properties. On the other hand, when the amount of the aliphatic oxycarboxylic acid is less than 0.02 mol %, the advantages inherent in the addition thereof would not be obtainable. The preferable range of the amount of the aliphatic oxycarboxylic acid is from 0.5 to 20 mol %, and the more preferable range is from 1.0 to 10 mol %.

The number-average molecular weight of the aliphatic copolyester of the present invention is 10,000 or more, in general, and preferably 20,000 or more, more preferably 30,000 or more. The upper limit of the number-average molecular weight of the copolymer is not restricted to a particular level, but may, for example, be 300,000. The "number-average molecular weights" used here in this specification are those measured by the GPC method, which will be described later in detail.

Other comonomeric components can be introduced to the aliphatic polyester copolymer of the present invention as long as they do not interfere with the advantages of the present invention. Examples of such other comonomeric components include aromatic oxycarboxylic acids such as hydroxybenzoic acid, aromatic diols such as bisphenol A, aromatic dicarboxylic acids such as terephthalic acid and isophthalic acid, polyhydric alcohols such as trimethylolpropane, glycerol and pentaerythritol, polycarboxylic acids such as trimellitic acid and anhydrides thereof, and hydroxypolycarboxylic acids such as malic acid, tartaric acid and citric acid. Of these, malic acid, trimethylolpropane, glycerol and pentaerythritol are preferable. When these "optional components" are bifunctional in terms of the production of a polyester, and, at the same time, aromatic, their use would deviate from the object of the present invention which is to increase the molecular weight of an aliphatic polyester. On the other hand, when the optional components are trifunctional or more, a polyester may be obtained as an undesired crosslinked product. Therefore, it is preferable to use these optional components in such a small amount of 10 mol or less, preferably 5 mol or less, for example, approximately 0.01 to 5 mol, for 100 mol of the aliphatic dicarboxylic acid which is an essential component in the present invention.

As mentioned above, the present invention is based on the fact that a high-molecular-weight aliphatic copolyester consisting of aliphatic diol unit, aliphatic carboxylic acid unit and aliphatic oxycarboxylic acid unit in a specific ratio, having a number-average molecular weight of 10,000 or more, preferably 20,000 or more, more preferably 30,000 or more, can be obtained as a polymer having strength and a melting point which are high enough for practical use. Typically, a high molecular weight can be extremely easily attained by the use of an aliphatic oxycarboxylic acid such as lactic acid, and in the presence of a catalyst comprising a germanium compound.

(3) Utilization of Polyester Produced

The high-molecular-weight aliphatic copolyesters according to the present invention can be processed into molded articles such as films, laminated films, sheets, boards, stretched sheets, monofilaments, multifilaments, nonwoven fabrics, flat yarns, staples, crimped fibers, fluted tapes, split yarns, composite fibers, blown bottles and foams by any of molding methods used for general-purpose plastics, such as injection molding, blow molding and extrusion molding. When molding is conducted, a nucleating agent, an antioxidant, a lubricant, a coloring agent, a releasing agent, a filler, or other polymers can be added, if necessary.

Further, the high-molecular-weight aliphatic copolyesters according to the present invention are biodegradable, and have the property of being completely degraded within 2 to 12 months by earth bacteria, so that they are very beneficial from the environmental and sanitary points of view. Therefore, the polymers of the present invention are expected to be used for producing shopping bags, garbage bags, films for use in the agricultural field, cosmetic containers, detergent containers, bleaching-agent containers, fishing lines, fishing nets, ropes, tying materials, ligatures, packaging materials for sanitary goods, insulating containers, cushioning materials and the like.

EXAMPLES

The following examples are given in order to more specifically explaining the present invention. The present invention is not limited by these examples, and any modification can be made as long as it is not beyond the scope of the invention.

It is noted that the property values shown in the following examples are those which were obtained by the following methods.

(1) Polymeric Composition: Obtained by calculation from the ratio of the areas of the spectra obtained by the $^1$H-NMR method.

(2) Number-average molecular weight (Mn): Measured by the GPC method. A sample dissolved in chloroform, and a "GPC HLC-8020" manufactured by TOSOH CORPORATION, Japan, were used for the measurement. The measured value was calculated in terms of polystyrene. The column used was "PLgel-10 micron-MIX" manufactured by TOSOH CORPORATION, Japan.

(3) Thermal properties: The melting point was determined by the DSC method (measured at a heating rate of 16° C./min under nitrogen).

(4) Tensile properties: A film having a thickness of 0.30 to 0.37 mm was prepared from each of the polyesters obtained in Examples and Comparative Examples by the bench hot press method. From this film, dumbbell specimens of No. 2 type were made in accordance with JIS K7127. The elongation at break and strength at break of each dumbbell specimen were measured in accordance with JIS K7127.

(5) Biodegradability test: A film having a thickness of 0.30 to 0.37 mm was prepared by the bench hot press method from the polyester obtained, and then cut into pieces having dimensions of 2 cm×2 cm. The test pieces thus obtained were kept in the ground for 3 months. The biodegradability of the polymer was confirmed by the visual observation of these test pieces.

Example 1

In a 100 ml reaction vessel equipped with a stirrer, a nitrogen-introducing tube, a heater, a thermometer and an inlet for additives, 35.4 g of succinic acid, 28.4 g of 1,4-butanediol and 2.9 g of a 90% aqueous solution of DL-lactic acid in which 1% by weight of germanium oxide had been dissolved in advance were charged. While stirring the contents of the reaction vessel, nitrogen gas was introduced into the vessel. Under nitrogen atmosphere, the temperature of the mixture was raised to 180° C., and reaction was carried out at the temperature for 45 minutes, and then under a reduced pressure of 20 mmHg for 1.75 hours. Subsequently, the temperature of the reaction mixture was raised to 220° C., and polymerization was effected under a reduced pressure of 0.5 mmHg for 4 hours to obtain a polyester.

The polymeric composition of the polyester determined by $^1$H-NMR was as follows: the lactic acid unit was 4.6 mol %, the 1,4-butanediol unit was 48.1 mol %, and the succinic acid unit was 47.3 mol %. The Mn and melting point of the polyester were 58,900 and 108° C., respectively. This polyester was made into a film by using a bench hot press. The film obtained was found to be tough. This film was subjected to the biodegradability test. After 3 months, a great number of holes like worm bores were found on the film; the polyester was thus confirmed to be biodegradable.

Example 2

In a 150 ml reaction vessel equipped with a stirrer, a nitrogen-introducing tube, a heater, a thermometer and an inlet for additives, 59.1 g of succinic acid, 49.6 g of 1,4-butanediol, 5.0 g of a 90% aqueous solution of L-lactic acid and 180 microliters of tetrabutoxy-germanium were charged. While stirring the contents of the reactor, nitrogen gas was introduced into the vessel. Under nitrogen atmosphere, the temperature of the mixture was raised to 185° C., and reaction was carried out at the temperature for 50 minutes, and then under a reduced pressure of 20 mmHg for 1.8 hours. Subsequently, the temperature of the reaction mixture was raised to 220° C., and polymerization was effected under a reduced pressure of 0.5 mmHg for 2 hours to obtain a polyester.

The polymeric composition of the polyester determined by $^1$H-NMR was as follows: the lactic acid unit was 4.4 mol %, the 1,4-butanediol unit was 47.8 mol %, and the succinic acid unit was 47.8 mol %. The Mn of the polyester was 69,000, and the tensile properties of the polyester were as shown in Table 1. Further, this polyester was confirmed to have biodegradability comparable to that of the polyester obtained in Example 1.

Example 3

In a 300 ml reaction vessel equipped with a stirrer, a nitrogen-introducing tube, a heater, a thermometer and an inlet for additives, 118.1 g of succinic acid, 99.1 g of 1,4-butanediol and 6.3 g of a 90% aqueous solution of DL-lactic acid in which 1% by weight of germanium oxide had been dissolved in advance were charged. While stirring the contents of the reaction vessel, nitrogen gas was introduced into the vessel. Under nitrogen atmosphere, the temperature of the mixture was raised to 185° C., and reaction was carried out at the temperature for 0.5 hours. The temperature of the inside of the reactor was then raised to 220° C., and the reaction was continued at the temperature for 0.5 hours. Subsequently, polymerization was effected under a reduced pressure of 0.5 mmHg for 4 hours to obtain a polyester.

The polymeric composition of the polyester determined by $^1$H-NMR was as follows: the lactic acid unit was 3.0 mol %, the 1,4-butanediol unit was 48.8 mol %, and the succinic acid unit was 48.2 mol %. The Mn of the polyester was 62,500,and the tensile properties of the polyester were as shown in Table 1. Further, this polyester was confirmed to have biodegradability comparable to that of the polyester obtained in Example 1.

Example 4

In the same reaction vessel as was used in Example 3, 118.1 g of succinic acid, 99.1 g of 1,4-butanediol and 6.3 g of a 70% aqueous solution of glycolic acid in which 1% by weight of germanium oxide had been dissolved in advance were charged. While stirring the contents of the reaction vessel, nitrogen gas was introduced into the vessel. Under nitrogen atmosphere, the temperature of the mixture was raised to 185° C., and reaction was carried out at the temperature for 0.5 hours. The temperature of the inside of the reactor was then raised to 220° C., and the reaction was continued at the temperature for 0.5 hours. Subsequently, polymerization was effected under a reduced pressure of 0.5 mmHg for 6 hours to obtain a polyester.

The polymeric composition of the polyester determined by $^1$H-NMR was as follows: the glycolic acid unit was 2.4 mol %, the 1,4-butanediol unit was 49.5 mol %, and the succinic acid unit was 48.1 mol %. The Mn of the polyester was 42,500. Further, this polyester was confirmed to have biodegradability comparable to that of the polyester obtained in Example 1.

Example 5

In a 300 ml reaction vessel equipped with a stirrer, a nitrogen-introducing tube, a heater, a thermometer and an inlet for additives, 100.3 g of succinic acid, 21.9 g of adipic acid, 103.1 g of 1,4-butanediol and 6.3 g of a 90% aqueous solution of L-lactic acid in which 1% by weight of germanium oxide had been dissolved in advance were charged. While stirring the contents of the reaction vessel, nitrogen gas was introduced into the vessel. Under nitrogen atmosphere, the temperature of the mixture was raised to 185° C., and reaction was carried out at the temperature for 0.5 hours. The temperature of the reaction mixture was then raised to 220° C., and the reaction was continued at the temperature for 0.5 hours. Subsequently, polymerization was effected under a reduced pressure of 0.5 mmHg for 4 hours.

The Mn and melting point of the polyester obtained were 71,000 and 95° C., respectively. The tensile properties of the polyester were as shown in Table 1. Further, the polymeric composition of the polyester determined by $^1$H-NMR was as follows: the lactic acid unit was 2.8 mol %, the 1,4-butanediol unit was 48.9 mol %, the succinic acid unit was 40.8 mol %, and the adipic acid unit was 7.5 mol %. A film made from the polyester was subjected to the biodegradability test. After 3 months, the film tested was found to be tattered; this polyester was thus confirmed to have biodegradability.

Comparative Example 1

In the same reaction vessel as was used in Example 2, 59.1 g of succinic acid, 47.3 g of 1,4-butanediol and 0.05 g of germanium oxide were charged. While stirring the contents of the reaction vessel, nitrogen gas was introduced into the vessel. Under nitrogen atmosphere, the temperature of the mixture was raised to 185° C., and reaction was carried out at the temperature for 50 minutes, and then under a reduced pressure of 20 mmHg for 2 hours. Subsequently, the temperature of the reaction mixture was raised to 220° C., and polymerization was effected under a reduced pressure of 0.5 mmHg for 4 hours.

The Mn of the polyester obtained was 1,500,and the tensile properties of the polyester were as shown in Table 1.

Comparative Example 2

In a 300 ml reaction vessel equipped with a stirrer, a nitrogen-introducing tube, a heater, a thermometer and an inlet for additives, 118.0 g of succinic acid, 99.1 g of 1,4-butanediol and 6.3 g of a 90% aqueous solution of DL-lactic acid in which 1% by weight of antimony oxide had been dissolved in advance were charged. While stirring the contents of the reaction vessel, nitrogen gas was introduced into the vessel. Under nitrogen atmosphere, the temperature of the mixture was raised to 185° C., and reaction was carried out at the temperature for 0.5 hours. The temperature of the reaction mixture was then raised to 220° C., and the reaction was continued at the temperature for 0.5 hours. Subsequently, polymerization was effected under a reduced pressure of 0.5 mmHg for 4 hours.

The Mn of the polyester obtained was 8,800. Further, the polymeric composition of the polyester determined by utilizing $^1$H-NMR was as follows: the lactic acid unit was 2.9 mol %, the 1,4-butanediol unit was 48.7 mol %, and the succinic acid unit was 48.4 mol %.

TABLE 1

| | Lactic Acid Content (mol %) | Number-Average Molecular Weight (Mn) | Elongation at Break (%) | Strength at Break (kg/cm2) |
| --- | --- | --- | --- | --- |
| Example 2 | 4.4 | 69,000 | 633.7 | 466.2 |
| Example 3 | 3.0 | 62,500 | 301.7 | 333.5 |
| Example 5 | 2.8 | 71,000 | 812.3 | 373.7 |
| Comp. Ex. 1 | 0 | 1,500 | Impossible to obtain a film | |

The results obtained in the above Examples and Comparative Examples clearly demonstrate the following:

(1) the polyester copolymers having aliphatic oxycarboxylic acid unit according to the present invention have high molecular weights (Examples 1 to 5), and show excellent tensile properties (Examples 2 and 3); and (2) in contrast to this, the polyester copolymers obtained in Comparative Examples have low molecular weights, and are insufficient in the tensile properties (Comparative Examples 1 and 2).

Example 6

In a 300 ml reaction vessel equipped with a stirrer, a nitrogen-introducing tube, a heater, a thermometer and an inlet for additives, 100.1 g of succinic anhydride, 99.1 g of 1,4-butanediol and 6.3 g of a 90% aqueous solution of DL-lactic acid (6.3 mol % of the amount of the succinic anhydride in mol) in which 1% by weight of germanium oxide had been dissolved in advance were charged. Reaction was carried out under nitrogen atmosphere at 185° C. for 0.5 hours. The temperature of the reaction mixture was then raised to 220° C., and the reaction was continued at the temperature for 0.5 hours. Subsequently, polymerization was effected under a reduced pressure of 0.5 mmHg for 6 hours.

The polyester obtained was of a white color. The Mn and melting point of the polyester were 67,600 and 108° C., respectively. Further, the polymeric composition of the polyester determined by $^1$H-NMR was as follows: the lactic acid unit was 3.2 mol %, the succinic acid unit was 48.4 mol %, and the 1,4-butanediol unit was 48.4 mol %. This polymer was made into a film having a thickness of 0.35 mm by using a bench hot press of 200° C., applying a pressure of 100 kg/cm$^2$. The film obtained was found to be tough. The tensile strength of this film was measured. As a result, the strength at break was 320 kg/cm$^2$, and the elongation at break was 330%. The film was also subjected to the biodegradability test. After 3 months, a great number of holes like worm bores were found on the film; the polyester was thus confirmed to be biodegradable.

Example 7

In a 300 ml reaction vessel equipped with a stirrer, a nitrogen-introducing tube, a heater, a thermometer and an inlet for additives, 100.1 g of succinic anhydride, 99.1 g of 1,4-butanediol, 10.6 g of a 90% aqueous solution of L-lactic acid (10.6 mol % of the amount of the succinic anhydride in mol), and 0.2 g of tetrabutoxygermanium were charged. Reaction was carried out under nitrogen atmosphere at 185° C. for 0.5 hours. The temperature of the reaction mixture was then raised to 220° C., and the reaction was continued at the temperature for 0.5 hours. Subsequently, polymerization was effected under a reduced pressure of 0.5 mmHg for 5 hours.

The polyester obtained was of a white color. The Mn and melting point of the polyester were 70,000 and 103° C., respectively. Further, the polymeric composition of the polyester determined by $^1$H-NMR was as follows: the lactic acid unit was 4.9 mol %, the succinic acid unit was 47.5 mol %, and the 1,4-butanediol unit was 47.6 mol %. This polymer was made into a film having a thickness of 0.35 mm by using a bench hot press. The film obtained was found to be tough. The tensile strength of this film was measured. As a result, the strength at break was 470 kg/cm$^2$, and the elongation at break was 630%. The polyester was found to have biodegradability comparable to that of the polyester obtained in Example 6.

Example 8

In a 300 ml reaction vessel equipped with a stirrer, a nitrogen-introducing tube, a heater, a thermometer and an inlet for additives, 50.1 g of succinic anhydride, 59.1 g of succinic acid, 99.1 g of 1,4-butanediol, and 6.3 g of a 70% aqueous solution of glycolic acid (11 mol % of the total amount of the succinic anhydride and the succinic acid in mol) in which 1% by weight of germanium oxide had been dissolved in advance were charged. Reaction was carried out under nitrogen atmosphere at 185° C. for 0.5 hours. The temperature of the reaction mixture was then raised to 220° C., and the reaction was continued at the temperature for 0.5 hours. Subsequently, polymerization was effected under a reduced pressure of 0.5 mmHg for 5 hours.

The polyester obtained was of a white color, and the Mn thereof was 60,000. Further, the polymeric composition of the polyester determined by $^1$H-NMR was as follows: the glycolic acid unit was 5.0 mol %, the succinic acid unit was 47.3 mol %, and the 1,4-butanediol unit was 47.7 mol %. This polymer was made into a film having a thickness of 0.35 mm by using a bench hot press. The film obtained was found to be tough. The tensile strength of this film was measured. As a result, the strength at break was 300 kg/cm$^2$, and the elongation at break was 310%. The polyester was found to have biodegradability comparable to that of the polyester obtained in Example 6.

Comparative Example 3

In a 300 ml reaction vessel equipped with a stirrer, a nitrogen-introducing tube, a heater, a thermometer and an inlet for additives, 100.1 g of succinic anhydride and 99.1 g of 1,4-butanediol were charged. Reaction was carried out under nitrogen atmosphere at 185° C. for 0.5 hours. The temperature of the reaction mixture was then raised to 220° C., and the reaction was continued at the temperature for 0.5 hours. Subsequently, 0.06 g of tetrabutyltitanate was added to the reaction mixture, and polymerization was effected under a reduced pressure of 0.5 mmHg for 4 hours.

The polyester obtained was an ash-colored wax, and the Mn thereof was 7,500. It was tried to obtain a film from this polyester by using a bench hot press. However, the polyester was so brittle that it could not be made into a film.

Comparative Example 4

An aliphatic polyester ("Bionolle #1010" manufactured by Showa Highpolymer Co., Ltd., Japan) composed of 1,4-butanediol unit and succinic acid unit with a small amount of urethane bond, having a number-average molecular weight of 65,100 was made into a film having a thickness of 0.35 mm by using a bench hot press. This film was subjected to a tensile test. As a result, the strength at break was 330 kg/cm$^2$, and the elongation at break was 280%.

Comparative Example 5

In a 200 ml reaction vessel equipped with a stirrer, a nitrogen-introducing tube, a heater, a thermometer and an inlet for additives, 103.5 g of a 90% aqueous solution of L-lactic acid and 0.05 g of germanium oxide were charged. Under nitrogen atmosphere, the mixture was stirred at 180° C. under normal pressures for 2 hours. The pressure was then reduced to 20 mmHg over one hour, and reaction was carried out for two hours. Subsequently, the temperature of the reaction mixture was raised over one hour, and polycondensation reaction was carried out at 200° C. under a reduced pressure of 2 mmHg for 8 hours.

The polylactic acid obtained was transparent although slightly yellowish, and the Mn thereof was 28,000. It was tried to obtain a film from this polylactic acid by using a bench hot press. However, the polymer was so brittle that it could not be made into a film.

Example 9

In a 200 ml reactionvessel equipped with a stirrer, a nitrogen-introducing tube, a heater, a thermometer and an inlet for additives, 38.4 g of succinic acid, 32.2 g of 1,4-butanediol, 2.03 g of a 90% aqueous solution of DL-lactic acid in which 1% by weight of germanium oxide had been dissolved in advance, and 6.07 g of a 90% aqueous solution of DL-lactic acid (25 mol of lactic acid for 100 mol of the succinic acid) were charged. Reaction was carried out under nitrogen atmosphere at 185° C. for 0.5 hours. The temperature of the reaction mixture was then raised to 220° C., and the reaction was continued at the temperature for 0.5 hours. Subsequently, polymerization was effected under a reduced pressure of 0.5 mmHg for 4 hours. In the course of the polycondensation reaction, a white crystalline product came out of the reaction system. The polyester obtained was of a brownish white color. The Mn and melting point of the polyester were 65,700 and 94° C., respectively. It was found that 22 mol of the lactic acid was introduced for 100 mol of the succinic acid.

Comparative Example 6

In a 200 ml reaction vessel equipped with a stirrer, a nitrogen-introducing tube, a heater, a thermometer and an inlet for additives, 38.4 g of succinic acid, 32.2 g of 1,4-butanediol, 8.12 g of a 90% aqueous solution of DL-lactic acid (25 mol of lactic acid for 100 mol of the succinic acid), and 0.66 g of tin powder were charged. Reaction was carried out under nitrogen atmosphere at 185° C. for 0.5 hours. The temperature of the reaction mixture was then raised to 220° C., and the reaction was continued at the temperature for 0.5 hours. Subsequently, polymerization was effected under a reduced pressure of 0.5 mmHg for 4 hours. The polyester obtained was of an orange color, and the Mn thereof was as low as 9,600. It was found that 15 mol of the lactic acid was introduced for 100 mol of the succinic acid.

It was tried to obtain a film from this polyester by using a bench hot press. However, the polyester was so brittle that it could not be made into a film.

Example 10

The procedure set forth in Example 2 was followed except for the use of 4.9 g of DL-2-hydroxy-n-butyric acid in place of 5.08 g of a 90% aqueous solution of DL-lactic acid to produce an aliphatic polyester copolymer.

The polyester obtained had a polymeric composition determined by $^1$H-NMR of: 2.9 mol % of the DL-2-hydroxy-n-butyric acid unit, 48.9 mol % of the 1,4-butanediol unit, and 48.2 mol % of the succinic acid unit. The Mn and melting point of the polymer were 65,000 and 110° C., respectively. This polymer was made into a film by using a bench hot press. The film obtained was found to be tough. The film was subjected to the biodegradability test. After 3 months, a great number of holes like worm bores were found on the film, whereby the film was thus confirmed to be biodegradable.

Example 11

The procedure set forth in Example 3 was followed except the additional use of 5.71 g of ε-caprolactone to produce an aliphatic polyester copolymer.

The polyester obtained had a polymeric composition determined by $^1$H-NMR of: 3.9 mol % of the lactic acid unit, 2.7 mol % of the hydroxycaproic acid, 47.6 mol % of the 1,4-butanediol unit, and 45.7 mol % of the succinic acid unit. The Mn and melting point of the polymer were 71,000 and 107° C., respectively. This polymer was made into a film by using a bench hot press. The film obtained was found to be tough. The film was subjected to the biodegradability test. After 3 months, the film was tattered, whereby the film was thus confirmed to be biodegradable.

Example 12

The procedure set forth in Example 3 was followed except the additional use of 0.2 g of DL-malic acid to produce an aliphatic polyester copolymer.

The polyester obtained was white in color and its Mn and melting point were 75,000 and 111° C., respectively. This polymer was made into a film by using a bench hot press. The film obtained was found to be tough. The film was subjected to the biodegradability test. After 3 months, a great number of holes were found on the film, whereby the film was thus confirmed to be biodegradable.

The aliphatic copolyesters of the present invention have the following advantages, so that their usefulness in the industrial fields is considerably high:

(1) the aliphatic copolyesters according to the present invention have molecular weights high enough for practical use, and can be molded into desired molded materials by any of molding methods used for general-purpose plastics; the molded materials such as films and fibers are excellent in thermal stability and physical properties such as tensile strength; and (2) the aliphatic copolyesters according to the present invention are highly biodegradable.

What is claimed is:

1. A condensation process for producing an aliphatic copolyester, comprising reacting an aliphatic dicarboxylic acid or a functional derivative thereof with an aliphatic diol in a polyester-producing condensation reaction at a temperature in a range of from 150° C. to 260° C. under a reduced pressure, substantially in the absence of a solvent and in the presence of a catalyst which comprises a germanium compound and of an aliphatic monohydroxymonocarboxylic acid in an amount of 0.04 to 60 mol for 100 mol of the aliphatic dicarboxylic acid so as to obtain an aliphatic copolyester whose number-average molecular weight is at least 10,000.

2. The process for producing an aliphatic copolyester according to claim 1, wherein the amount of the aliphatic diol is from 101 to 150 mol for 100 mol of the aliphatic dicarboxylic acid.

3. The process for producing an aliphatic copolyester according to claim 1, wherein the amount of the aliphatic monohydroxymonocarboxylic acid is from 1.0 to 40 mol for 100 mol of the aliphatic dicarboxylic acid.

4. The process for producing an aliphatic copolyester according to claim 1, wherein the amount of the aliphatic monohydroxymonocarboxylic acid is from 2 to 20 mol for 100 mol of the aliphatic dicarboxylic acid.

5. The process for producing an aliphatic copolyester according to claim 1, wherein the aliphatic dicarboxylic acid is represented by the following formula:

$$R^0—CO—R^1—CO—R^0 \qquad (1)$$

wherein $R^1$ represents a direct bond or an aliphatic group, and $R^0$ represents OH or a functional derivative of the carboxyl group.

6. The process for producing an aliphatic copolyester according to claim 5, wherein the aliphatic dicarboxylic acid is represented by the following formula:

$$HOCO-(CH_2)_m-COOH \qquad (1a)$$

wherein m is 0 or an integer of 1 to 10.

7. The process for producing an aliphatic copolyester according to claim 1, wherein the aliphatic diol is represented by the following formula:

$$HO-R^2-OH \qquad (2)$$

wherein $R^2$ represents a divalent aliphatic group.

8. The process for producing an aliphatic copolyester according to claim 7, wherein the aliphatic diol is represented by the following formula:

$$HO-(CH_2)_n-OH \qquad (2a)$$

wherein n is an integer of 2 to 10.

9. The process for producing an aliphatic copolyester according to claim 1, wherein the aliphatic monohydroxymonocarboxylic acid is represented by the following formula:

$$HO-R^3-CO-R^0 \qquad (3)$$

wherein $R^3$ represents a divalent aliphatic group.

10. The process for producing an aliphatic copolyester according to claim 9, wherein the aliphatic monohydroxymonocarboxylic acid is represented by the following formula:

$$HO-\underset{\underset{C_aH_{2a+1}}{|}}{CH}-COOH \qquad (3a)$$

wherein a is 0 or an integer of 1 to 10.

11. The process for producing an aliphatic copolyester according to claim 1, wherein the aliphatic dicarboxylic acid is succinic acid and/or anhydride thereof, optionally in admixture with adipic acid; the aliphatic diol is 1,4-butanediol; and the aliphatic monohydroxymonocarboxylic acid is lactic acid or glycolic acid.

12. The process for producing an aliphatic copolyester according to claim 1, wherein the germanium compound to be used as the catalyst is selected from the group consisting of germanium oxide, germanium halides, and tetraalkoxygermaniums.

13. The process for producing an aliphatic copolyester according to claim 12, wherein the germanium compound is germanium oxide.

14. The process for producing an aliphatic copolyester according to claim 1, wherein the catalyst is used in solution in an aqueous solution of the aliphatic monohydroxymonocarboxylic acid.

* * * * *